(12) United States Patent
Katsumata et al.

(10) Patent No.: US 10,580,586 B2
(45) Date of Patent: Mar. 3, 2020

(54) DYE-SENSITIZED PHOTOELECTRIC CONVERSION ELEMENT

(71) Applicant: FUJIKURA LTD., Tokyo (JP)

(72) Inventors: Kenji Katsumata, Chiba (JP); Ko Nishiwaki, Saitama (JP)

(73) Assignee: FUJIKURA LTD., Tokyo (JP)

( * ) Notice: Subject to any disclaimer, the term of this patent is extended or adjusted under 35 U.S.C. 154(b) by 177 days.

(21) Appl. No.: 15/527,806

(22) PCT Filed: Nov. 18, 2015

(86) PCT No.: PCT/JP2015/082400
§ 371 (c)(1),
(2) Date: May 18, 2017

(87) PCT Pub. No.: WO2016/080440
PCT Pub. Date: May 26, 2016

(65) Prior Publication Data
US 2017/0323733 A1    Nov. 9, 2017

(30) Foreign Application Priority Data

Nov. 19, 2014  (JP) ................................ 2014-234231

(51) Int. Cl.
*H01G 9/20*  (2006.01)
*C09B 57/10*  (2006.01)

(52) U.S. Cl.
CPC ........... *H01G 9/2022* (2013.01); *C09B 57/10* (2013.01); *H01G 9/2009* (2013.01);
(Continued)

(58) Field of Classification Search
None
See application file for complete search history.

(56) References Cited

U.S. PATENT DOCUMENTS

2011/0232736 A1    9/2011   Goldstein et al.
2013/0032193 A1    2/2013   Okada
(Continued)

FOREIGN PATENT DOCUMENTS

JP    2005-346971 A    12/2005
JP    2011-222428 A    11/2011
(Continued)

OTHER PUBLICATIONS

Communication dated Mar. 8, 2018, from European Patent Office in counterpart application No. 15860925.5.
(Continued)

*Primary Examiner* — Shannon M Gardner
(74) *Attorney, Agent, or Firm* — Sughrue Mion, PLLC

(57) ABSTRACT

Disclosed is a photoelectric conversion element including a cell. The cell includes a first electrode, a second electrode, an oxide semiconductor layer provided on the first electrode, and an electrolyte provided between the first and second electrodes. The second electrode includes an annular portion, an approaching portion approaching the oxide semiconductor layer closer than the annular portion and an annular connecting portion connecting the annular portion and the approaching portion, and the oxide semiconductor layer includes an inner part facing the approaching portion on the first electrode and an annular outer part provided around the inner part and facing the connecting portion. The outer part includes a plurality of linear portions separated from one another and a corner portion connecting two adjacent linear portions to each other, the corner portion is thicker than the linear portion, and the linear portion is thicker than the inner part.

10 Claims, 5 Drawing Sheets

(52) U.S. Cl.
CPC ......... *H01G 9/2031* (2013.01); *H01G 9/2059* (2013.01); *H01G 9/2068* (2013.01); *Y02E 10/542* (2013.01)

(56) References Cited

U.S. PATENT DOCUMENTS

2013/0153021 A1\* 6/2013 Doi ..................... H01G 9/2027
136/256
2014/0166104 A1 6/2014 Doi

FOREIGN PATENT DOCUMENTS

JP 2015-046223 A 3/2015
WO 2014/162640 A1 10/2014

OTHER PUBLICATIONS

International Search Report for PCT/JP2015/082400 dated Feb. 9, 2016.

\* cited by examiner

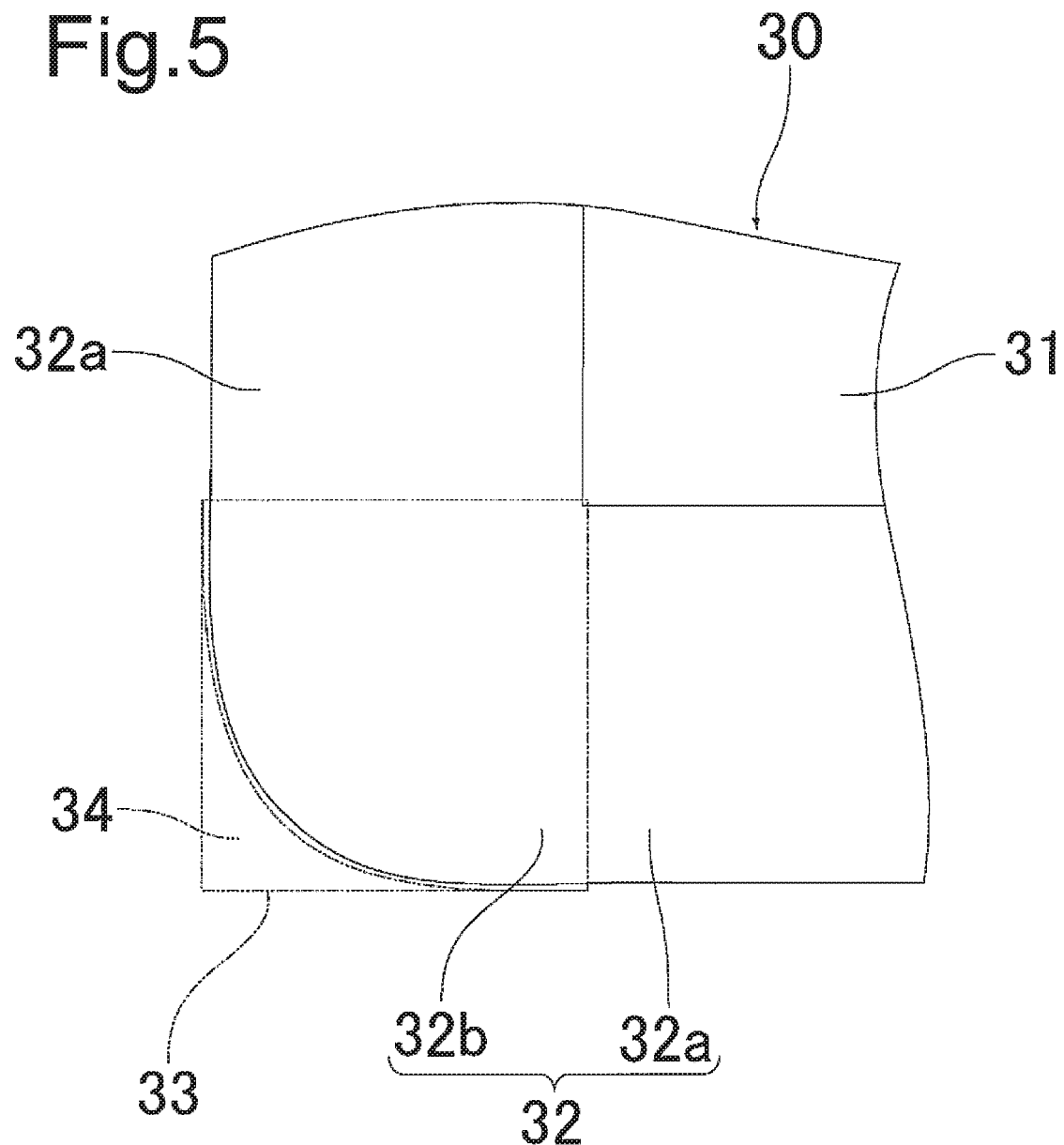

though the second electrode toward the oxide semiconductor layer side to decrease the distance between

DYE-SENSITIZED PHOTOELECTRIC CONVERSION ELEMENT

CROSS REFERENCE TO RELATED APPLICATIONS

This application is a National Stage of International Application No. PCT/JP2015/082400 filed Nov. 18, 2015, claiming priority based on Japanese Patent Application No. 2014-234231 filed Nov. 19, 2014, the contents of all of which are incorporated herein by reference in their entirety.

TECHNICAL FIELD

The present invention relates to a dye-sensitized photoelectric conversion element.

BACKGROUND ART

Dye-sensitized photoelectric conversion elements have been developed by Gratzel et al. of Switzerland and are a next generation photoelectric conversion element attracting attention since they have advantages such as a high photoelectric conversion efficiency and low manufacturing cost.

Generally, dye-sensitized photoelectric conversion elements are equipped with at least one dye-sensitized photoelectric conversion cell, and the dye-sensitized photoelectric conversion cell is equipped with a first electrode, a second electrode which faces the first electrode, an oxide semiconductor layer that is provided on the first electrode, an electrolyte that is provided between the first electrode and the second electrode, and an annular sealing portion which joins the first electrode and the second electrode.

In such a dye-sensitized photoelectric conversion cell of a dye-sensitized photoelectric conversion element, the thickness of the sealing portion is required to be sufficiently thick in order to secure the durability. On the other hand, it is possible to obtain a higher short-circuit current density while suppressing the amount of the oxide semiconductor to be used and to improve the photoelectric conversion characteristics by bending the second electrode which faces the first electrode via the sealing portion toward the oxide semiconductor layer side to decrease the distance between the oxide semiconductor layer and the second electrode (see, for example, the following Patent Document 1). Such a structure of a dye-sensitized photoelectric conversion cell can be easily realized by conducting sealing under reduced pressure or by conducting sealing while pushing the second electrode toward the oxide semiconductor layer side with a convexly bent plate.

CITATION LIST

Patent Document

Patent Document 1: JP 2011-222428 A

SUMMARY OF THE INVENTION

Problem to be Solved by the Invention

However, the dye-sensitized photoelectric conversion element described in Patent Document 1 above has the following problems.

In other words, in the dye-sensitized photoelectric conversion element described in Patent Document 1 above, the part in the vicinity of the sealing portion of the second electrode cannot sufficiently approach the oxide semiconductor layer since the sealing portion becomes an obstacle. Particularly, since the sealing portion is in a bent state in the vicinity of the corner portion of the sealing portion of the second electrode and it thus becomes a big obstacle when bending the second electrode toward the oxide semiconductor layer side, particularly the part in the vicinity of the corner portion of the sealing portion of the second electrode cannot thus sufficiently approach the oxide semiconductor layer. Hence, the dye-sensitized photoelectric conversion element described in Patent Document 1 above cannot obtain a sufficiently high short-circuit current density and has room for improvement in terms of improving the photoelectric conversion characteristics.

The present invention has been made in view of the above circumstances, and an object thereof is to provide a dye-sensitized photoelectric conversion element capable of improving the photoelectric conversion characteristics.

Means for Solving Problem

In order to solve the above problem, the present inventors have carried out intensive studies, and as a result, it has been found out that the above problem can be solved by the following invention.

In other words, the present invention is a dye-sensitized photoelectric conversion element including at least one dye-sensitized photoelectric conversion cell, in which the dye-sensitized photoelectric conversion cell includes a first electrode, a second electrode facing the first electrode, an oxide semiconductor layer provided on the first electrode, and an electrolyte provided between the first electrode and the second electrode, in which the second electrode includes an annular portion, an approaching portion approaching the oxide semiconductor layer closer than the annular portion and an annular connecting portion connecting the annular portion and the approaching portion, and the oxide semiconductor layer includes an inner part facing the approaching portion of the second electrode on the first electrode and an annular outer part which is provided around the inner part and faces the connecting portion of the second electrode, in which the outer part includes a plurality of linear portions separated from one another and a corner portion connecting two adjacent linear portions to each other among the plurality of linear portions in a case in which the outer part is viewed in a thickness direction of the oxide semiconductor layer, a thickness of the corner portion of the outer part is greater than a thickness of the linear portion of the outer part, and a thickness of the linear portion of the outer part is greater than a thickness of the inner part.

According to the dye-sensitized photoelectric conversion element of the present invention, in the dye-sensitized photoelectric conversion cell, the thickness of the corner portion of the outer part of the oxide semiconductor layer is greater than the thickness of the linear portion of the outer part and the thickness of the linear portion of the outer part is greater than the thickness of the inner part. Hence, it is possible not only to decrease the distance between the inner part of the oxide semiconductor layer and the approaching portion of the second electrode but also to decrease the distance between the corner portion of the outer part of the oxide semiconductor layer and the connecting portion of the second electrode and the distance between the linear portion of the outer part of the oxide semiconductor layer and the connecting portion of the second electrode. Hence, it is possible to increase the short-circuit current density in the dye-sensitized photoelectric conversion cell and to improve the photoelectric conversion characteristics of the dye-sensitized photoelectric conversion element.

In the dye-sensitized photoelectric conversion element, it is preferable that a ratio of a thickness of the linear portion of the outer part to a thickness of the inner part be 1.1 or more.

In this case, an advantage is obtained that the photoelectric conversion characteristics can be further improved as compared to a case in which the ratio of the thickness of the linear portion of the outer part to the thickness of the inner part is less than 1.1.

In the dye-sensitized photoelectric conversion element, it is preferable that a ratio of a thickness of the linear portion of the outer part to a thickness of the inner part is 1.7 or less.

In this case, the application of stress to the linear portion by the second electrode is sufficiently suppressed and the breakage of the oxide semiconductor layer is less likely to occur in a case in which the distance between the first electrode and the second electrode is shortened as compared to a case in which the ratio of the thickness of the linear portion of the outer part to the thickness of the inner part exceeds 1.7.

In the dye-sensitized photoelectric conversion element, it is preferable that a ratio of a thickness of the corner portion of the outer part to a thickness of the linear portion of the outer part be 1.1 or more.

In this case, it is possible to further improve the photoelectric conversion characteristics as compared to a case in which the ratio of the thickness of the corner portion of the outer part to the thickness of the linear portion of the outer part is less than 1.1.

In the dye-sensitized photoelectric conversion element, it is preferable that a ratio of a thickness of the corner portion of the outer part to a thickness of the linear portion of the outer part be 1.7 or less.

In this case, the application of stress to the corner portion by the second electrode is sufficiently suppressed and the breakage of the oxide semiconductor layer is less likely to occur in a case in which the distance between the first electrode and the second electrode is shortened as compared to a case in which the ratio of the thickness of the corner portion of the outer part to the thickness of the linear portion of the outer part exceeds 1.7.

In the dye-sensitized photoelectric conversion element, it is preferable that the corner portion be formed by cutting off a part on a side opposite to the inner part of an intersecting portion formed by extending and crossing the two linear portions in a case in which the oxide semiconductor layer is viewed in a thickness direction of the oxide semiconductor layer.

In this case, the corner portion of the oxide semiconductor layer is less likely to peel off from the first electrode and it is possible to improve the durability of the dye-sensitized photoelectric conversion element equipped with the dye-sensitized photoelectric conversion cell as compared to a case in which the corner portion is formed without cutting off the part on the side opposite to the inner part of the intersecting portion formed by extending and crossing the two linear portions in a case in which the oxide semiconductor layer is viewed in the thickness direction of the oxide semiconductor layer.

In the dye-sensitized photoelectric conversion element, it is preferable that the dye-sensitized photoelectric conversion cell further include an annular sealing portion joining the first electrode and the annular portion of the second electrode, and that the sealing portion and the oxide semiconductor layer be separated from each other.

Since the dye-sensitized photoelectric conversion element can improve the photoelectric conversion characteristics, it is possible to sufficiently secure the distance between the first electrode and the annular portion of the second electrode, namely, the thickness of the sealing portion in the dye-sensitized photoelectric conversion cell and to improve the durability.

The dye-sensitized photoelectric conversion element is particularly useful in a case in which the sealing portion is disposed so as to surround the oxide semiconductor layer, the sealing portion includes a plurality of second linear portions provided along the outer part of the oxide semiconductor layer and a second corner portion connecting two adjacent second linear portions each other among the plurality of second linear portions in a case in which the sealing portion is viewed in a thickness direction of the oxide semiconductor layer, and the second corner portion of the sealing portion is disposed on a side opposite to the inner part with respect to a corner portion of the outer part.

In the dye-sensitized photoelectric conversion element, it is preferable that a ratio of a thickness of the corner portion to a thickness of the inner part be 2 or less.

According to the dye-sensitized photoelectric conversion element of the present invention, it is possible to further improve the photoelectric conversion characteristics as compared to a case in which the ratio of the thickness of the corner portion to the thickness of the inner part exceeds 2.

In the dye-sensitized photoelectric conversion element, it is preferable that a ratio of a thickness of the corner portion to a thickness of the inner part be 1.2 or more.

In this case, it is possible to further improve the photoelectric conversion efficiency of the dye-sensitized photoelectric conversion element as compared to a case in which the ratio of the thickness of the corner portion to the thickness of the inner part is less than 1.2.

Incidentally, in the present invention, the "thickness direction of the oxide semiconductor layer" refers to a direction orthogonal to the interface between the first electrode and the oxide semiconductor layer.

In addition, in the present invention, the "thickness of the corner portion of the outer part" and the "thickness of the linear portion of the outer part" refer to the thickness at the position distant by 1 mm from the peripheral portion of the oxide semiconductor layer in a case in which the oxide semiconductor layer is viewed from the thickness direction thereof.

In addition, in the present invention, the "thickness of the inner part" is the average thickness of the inner part, and this average thickness refers to the average value of the thickness at the center of the inner part and the thicknesses at five or more points in the middle between the center and the outer part.

In addition, the "thickness" in the "thickness of the inner part", the "thickness of the corner portion of the outer part", and the "thickness of the linear portion of the outer part" refers to the thickness along the direction orthogonal to the interface between the first electrode and the oxide semiconductor layer.

Effect of the Invention

According to the present invention, a dye-sensitized photoelectric conversion element capable of improving the photoelectric conversion characteristics is provided.

BRIEF DESCRIPTION OF DRAWINGS

FIG. 5 is a partial plan view illustrating a modified example of the oxide semiconductor layer in FIG. 2.

MODE(S) FOR CARRYING OUT THE INVENTION

Figure 1:
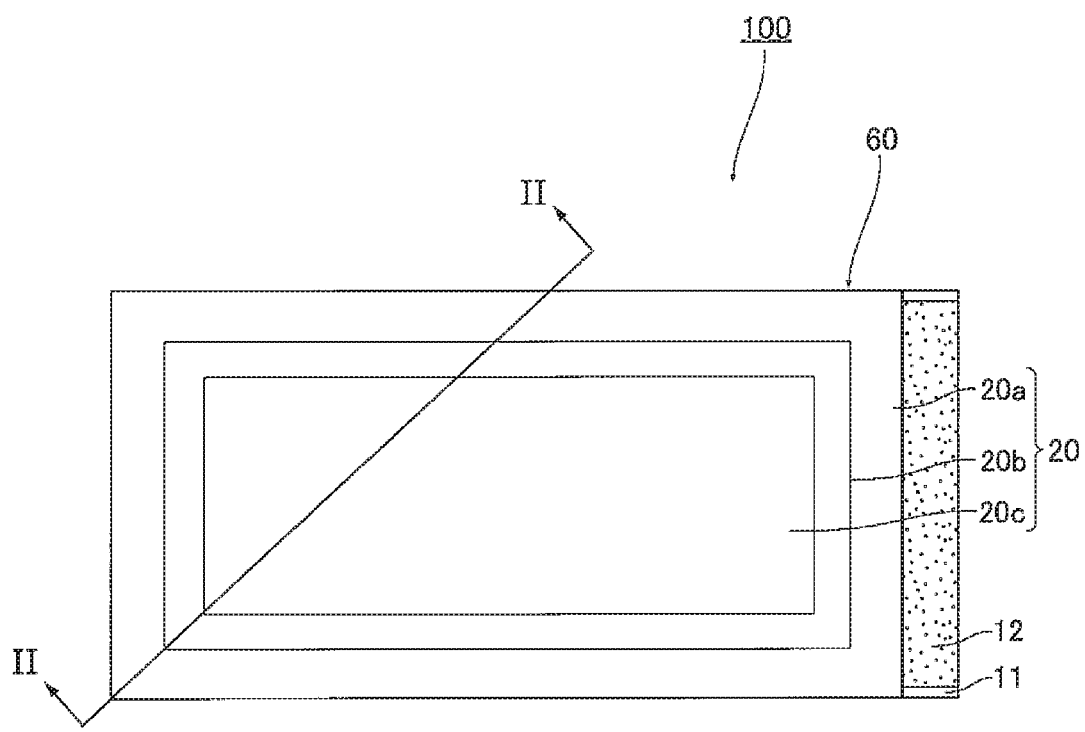
FIG. 1 is a plan view illustrating an embodiment of a dye-sensitized photoelectric conversion element of the present invention.
Figure 3:
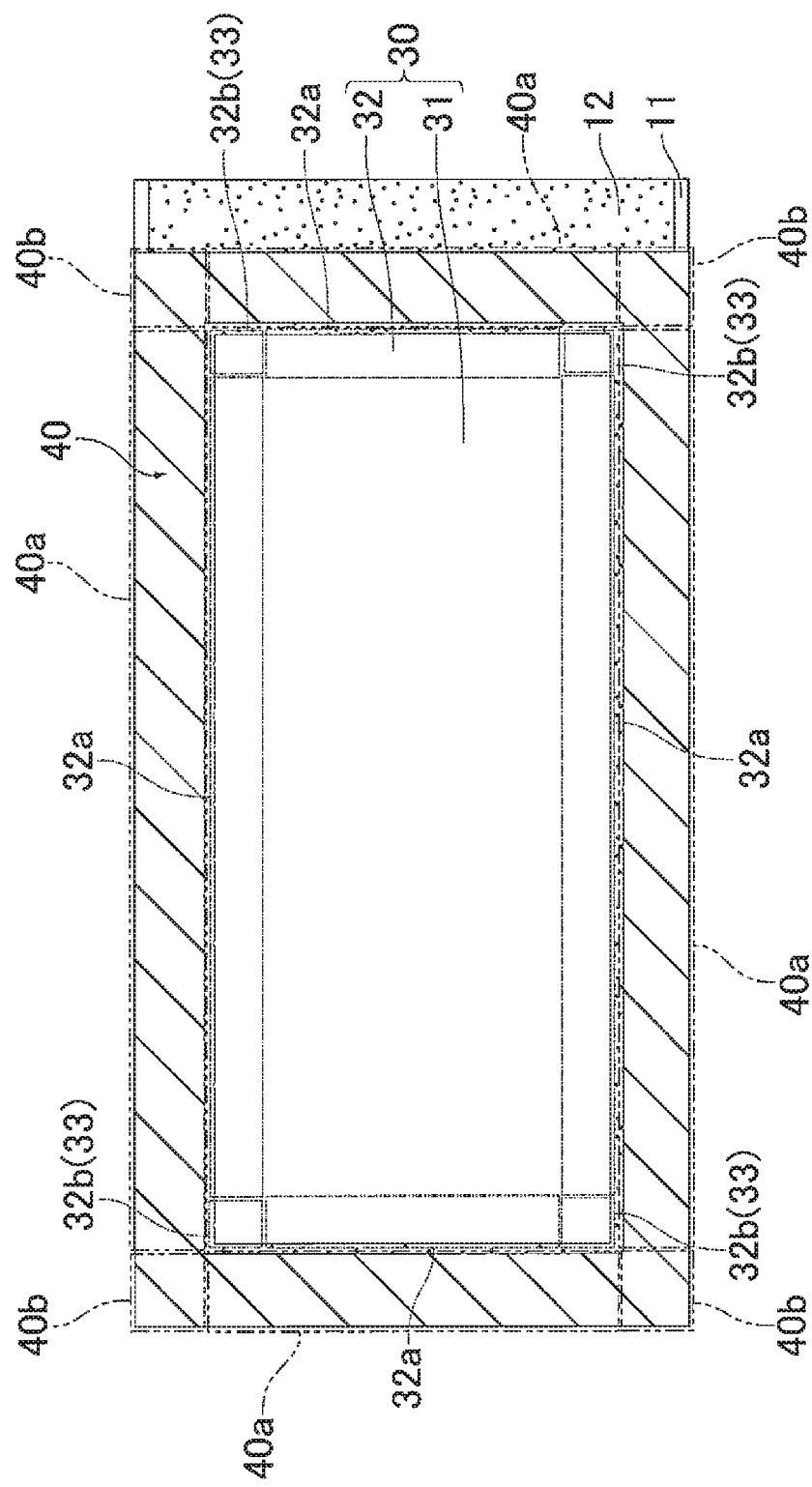
FIG. 3 is a plan view illustrating the part remained after the second electrode is removed from the dye-sensitized photoelectric conversion element in FIG. 1.
Figure 4:
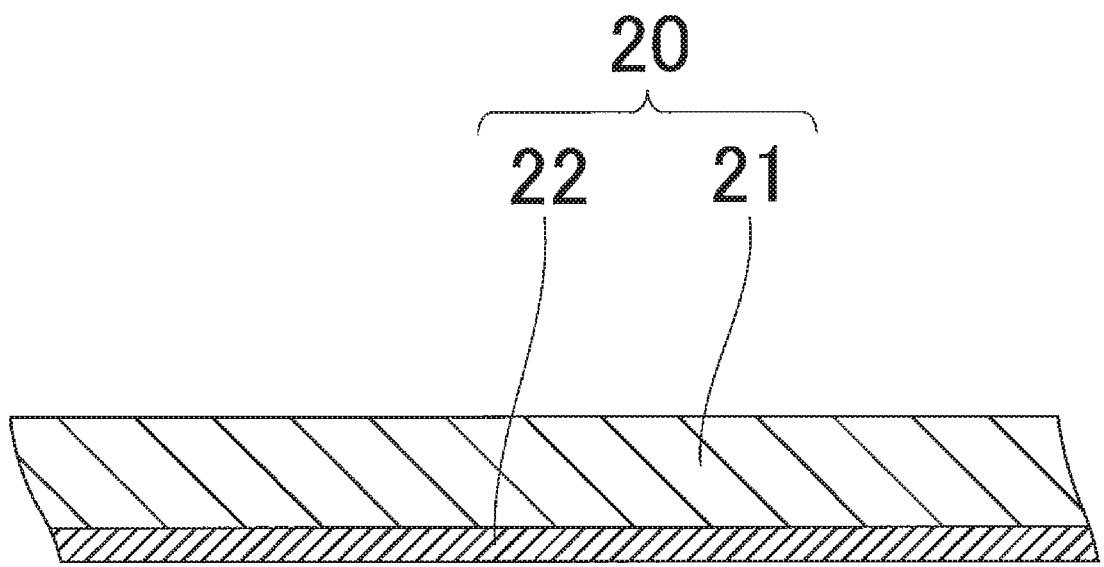
FIG. 4 is a partial cross-sectional view illustrating the second electrode in FIG. 1.

Hereinafter, embodiments of the present invention will be described in detail with reference to FIGS. 1 to 4. FIG. 1 is a plan view illustrating an embodiment of the dye-sensitized photoelectric conversion element of the present invention, FIG. 2 is a cross-sectional end face view taken along the line II-II in FIG. 1, FIG. 3 is a plan view illustrating the part remained after the second electrode is removed the dye-sensitized photoelectric conversion element in FIG. 1, and FIG. 4 is a partial cross-sectional view illustrating the second electrode in FIG. 1.

Figure 2:
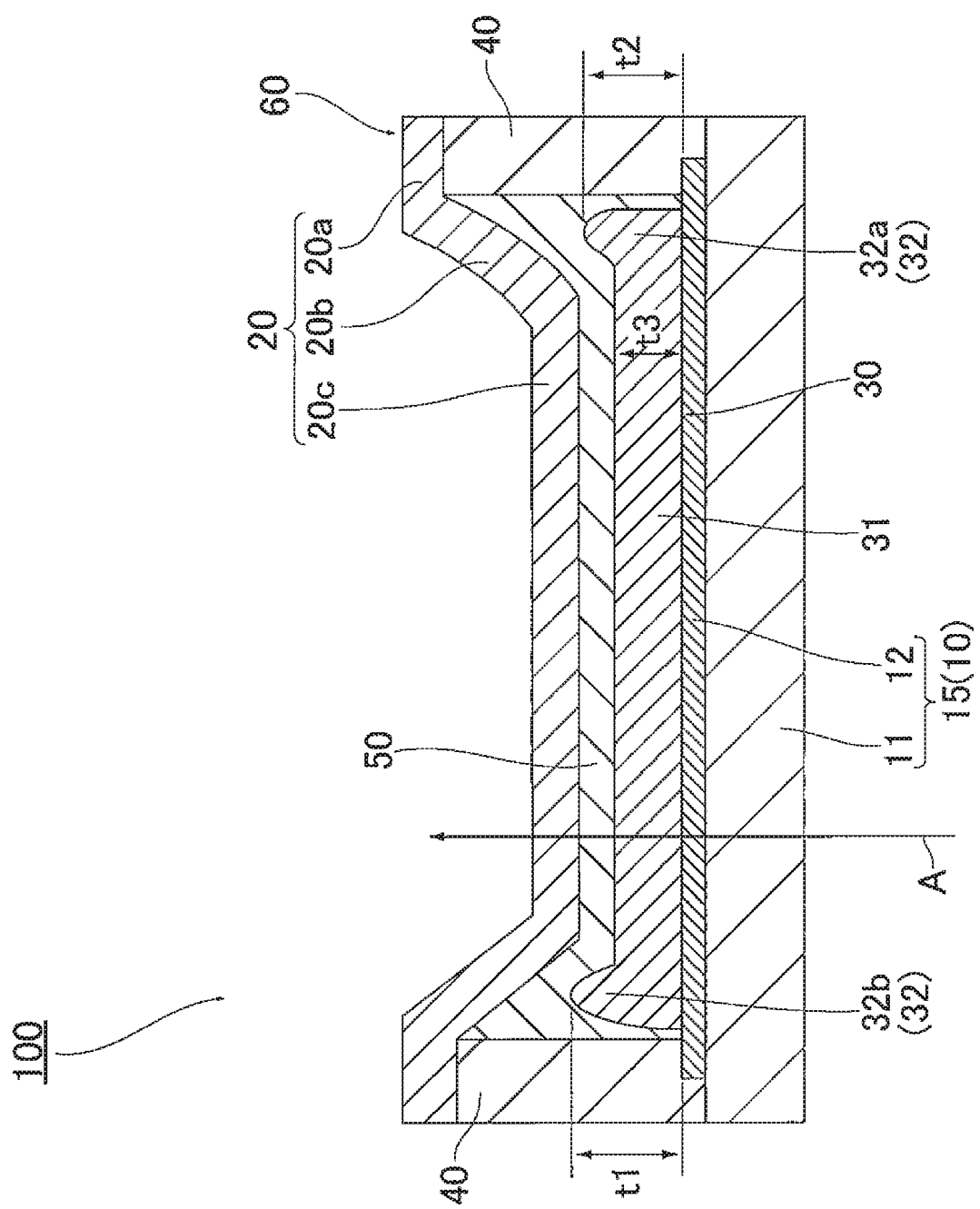
FIG. 2 is a cross-sectional end face view taken along the line II-II in FIG. 1.

As illustrated in FIGS. 1 and 2, a dye-sensitized photoelectric conversion element 100 is constituted by one dye-sensitized photoelectric conversion cell 60, and the dye-sensitized photoelectric conversion cell 60 is equipped with a first electrode 10, a second electrode 20 which faces the first electrode 10, an oxide semiconductor layer 30 that is provided on the first electrode 10, and an annular sealing portion 40 which joins the first electrode 10 and the second electrode 20. An electrolyte 50 is filled in the cell space formed by the first electrode 10, the second electrode 20, and the sealing portion 40.

The first electrode 10 is composed of a transparent conductive substrate 15 constituted by a transparent substrate 11 and a transparent conductive film 12 provided on the transparent substrate 11. Here, the peripheral portion of the transparent conductive film 12 is sandwiched between the sealing portion 40 and the transparent substrate 11 (see FIG. 2). In addition, a part of the transparent conductive film 12 extends to the outside of the annular sealing portion 40, and this part which extends to the outside of the sealing portion 40 functions as a power extracting portion for extracting the electric power (see FIG. 1).

The second electrode 20 is equipped with an annular portion 20a to be joined to the sealing portion 40, an approaching portion 20c that is closer to the oxide semiconductor layer 30 than the annular portion 20a, an annular connecting portion 20b which connects the annular portion 20a and the approaching portion 20c, and the connecting portion 20b is inclined with respect to the surface of the transparent substrate 11 of the first electrode 10. In other words, the second electrode 20 is provided so as to bend toward the oxide semiconductor layer 30. In addition, as illustrated in FIG. 4, the second electrode 20 is equipped with a conductive substrate 21 and a catalyst layer 22 which is provided on the transparent conductive substrate 15 side of the conductive substrate 21 and contributes to the reduction of the electrolyte 50.

The oxide semiconductor layer 30 is disposed on the inside of the sealing portion 40. In other words, the sealing portion 40 is disposed so as to surround the oxide semiconductor layer 30. The sealing portion 40 and the oxide semiconductor layer 30 are separated from each other. In addition, a photosensitizing dye is adsorbed to the oxide semiconductor layer 30. The oxide semiconductor layer 30 includes an inner part 31 which faces the approaching portion 20c of the second electrode 20 on the first electrode 10 and an annular (a rectangular shape in the present embodiment) outer part 32 which is provided around the inner part 31 and faces the connecting portion 20b of the second electrode 20. As illustrated in FIG. 2 and FIG. 3, the outer part 32 includes a plurality (four in FIG. 3) of linear portions 32a that are separated from one another and a corner portion 32b which connects two adjacent linear portions 32a to each other among the plurality of linear portions 32a in a case in which the outer part 32 is viewed in the thickness direction A of the oxide semiconductor layer 30. Here, the corner portion 32b of the outer part 32 is constituted by an intersecting portion 33 that is formed by extending and crossing two linear portions 32a in a case in which the oxide semiconductor layer 30 is viewed in the thickness direction A thereof. Moreover, as illustrated in FIG. 2, the thickness t1 of the corner portion 32b of the outer part 32 is greater than the thickness t2 of the linear portion 32a of the outer part 32 and the thickness t2 of the linear portion 32a of the outer part 32 is greater than the thickness t3 of the inner part 31.

Meanwhile, as illustrated in FIG. 2 and FIG. 3, the sealing portion 40 includes a plurality (four in FIG. 3) of second linear portions 40a that are provided along the outer part 32 of the oxide semiconductor layer 30 and a second corner portion 40b which connects two adjacent second linear portions 40a each other among the plurality of second linear portions 40a in a case in which the sealing portion 40 is viewed in the thickness direction A of the oxide semiconductor layer 30. Moreover, the second corner portion 40b of the sealing portion 40 is disposed on the side opposite to the inner part 31 with respect to the corner portion 32b of the outer part 32.

According to the dye-sensitized photoelectric conversion element 100, in the dye-sensitized photoelectric conversion cell 60, the part other than the vicinity of the corner portion of the sealing portion 40 of the connecting portion 20b of the second electrode 20 is closer to the first electrode 10 side than the part in the vicinity of the corner portion of the sealing portion 40 of the connecting portion 20b. In contrast, in the dye-sensitized photoelectric conversion cell 60, the thickness t1 of the corner portion 32b of the outer part 32 of the oxide semiconductor layer 30 is greater than the thickness t2 of the linear portion 32a of the outer part 32 and the thickness t2 of the linear portion 32a of the outer part 32 is greater than the thickness t3 of the inner part 31. Hence, it is possible not only to decrease the distance between the inner part 31 of the oxide semiconductor layer 30 and the approaching portion 20c of the second electrode 20 but also to decrease the distance between the corner portion 32b of the outer part 32 of the oxide semiconductor layer 30 and the connecting portion 20b of the second electrode 20 and the distance between the linear portion 32a of the outer part 32 of the oxide semiconductor layer 30 and the connecting portion 20b of the second electrode 20. Hence, it is possible to increase the short-circuit current density in the dye-sensitized photoelectric conversion cell 60 and to improve the photoelectric conversion characteristics of the dye-sensitized photoelectric conversion element 100.

Next, the first electrode 10, the second electrode 20, the oxide semiconductor layer 30, the sealing portion 40, the electrolyte 50, and the photosensitizing dye will be described in detail.

<First Electrode>

As described above, the first electrode 10 is constituted by the transparent conductive substrate 15 and the transparent conductive substrate 15 is constituted by the transparent substrate 11 and the transparent conductive film 12 provided on the transparent substrate 11.

The material constituting the transparent substrate 11 may be any transparent material, for example, and examples of such a transparent material may include glass such as borosilicate glass, soda lime glass, glass which is made of soda lime and whose iron component is less than that of ordinary soda lime glass, and quartz glass, polyethylene terephthalate (PET), polyethylene naphthalate (PEN), polycarbonate (PC), and polyethersulfone (PES). The thickness of the transparent substrate 11 is appropriately determined depending on the size of the dye-sensitized photoelectric conversion element 100 and is not particularly limited, but it may be set into the range of from 50 to 40000 μm, for example.

Examples of the material constituting the transparent conductive film 12 may include a conductive metal oxide such as indium-tin-oxide (ITO), tin oxide ($SnO_2$), and fluorine-doped-tin-oxide (FTO). The transparent conductive film 12 may be constituted by a single layer or a laminate consisting of a plurality of layers which are constituted by different conductive metal oxides. It is preferable that the transparent conductive film 12 be constituted by FTO since FTO exhibits high heat resistance and chemical resistance in a case in which the transparent conductive film 12 is constituted by a single layer. The thickness of the transparent conductive film 12 may be set into the range of from 0.01 to 2 μm, for example.

(Second Electrode)

As described above, the second electrode 20 is equipped with the conductive substrate 21 and the conductive catalyst layer 22 which is provided on the side of the conductive substrate 21 facing the first electrode 10 and which contributes to the reduction of the electrolyte 50.

The conductive substrate 21 is constituted, for example, by a corrosion resistant metal material such as titanium, nickel, platinum, molybdenum, tungsten, aluminum, or stainless steel or a laminate in which a transparent conductive film composed of a conductive oxide such as ITO or FTO is formed on the transparent substrate 11 described above. Here, in a case in which the conductive substrate 21 is constituted by a laminate in which a transparent conductive film is formed on the transparent substrate 11, the transparent conductive film is provided on the transparent substrate 11 at least at the approaching portion 20c and connecting portion 20b of the second electrode 20. Here, the transparent conductive film may be present between the transparent substrate 11 and the sealing portion 40 in the annular portion 20a, or it may not be present. In addition, the thickness of the conductive substrate 21 is appropriately determined according to the size of the dye-sensitized photoelectric conversion element 100, and it is not particularly limited, but it may be, for example, from 0.005 to 4 mm.

The catalyst layer 22 is constituted by platinum, a carbon-based material, a conductive polymer or the like. Here, as the carbon-based material, carbon nanotubes are particularly suitably used.

<Oxide Semiconductor Layer>

The oxide semiconductor layer 30 is constituted by oxide semiconductor particles. The oxide semiconductor particles are constituted by, for example, titanium oxide ($TiO_2$), silicon oxide ($SiO_2$), zinc oxide (ZnO), tungsten oxide ($WO_3$), niobium oxide ($Nb_2O_5$), strontium titanate ($SrTiO_3$), tin oxide ($SnO_2$), indium oxide ($In_3O_3$), zirconium oxide ($ZrO_2$), thallium oxide ($Ta_2O_5$), lanthanum oxide ($La_2O_3$), yttrium oxide ($Y_2O_3$), holmium oxide ($Ho_2O_3$), bismuth oxide ($Bi_2O_3$), cerium oxide ($CeO_2$), aluminum oxide ($Al_2O_3$), or two or more kinds of these.

The ratio (t2/t3) of the thickness t2 of the linear portion 32a of the outer part 32 to the thickness t3 of the inner part 31 is not particularly limited as long as it is greater than 1, but it is preferably 1.1 or more and more preferably 1.3 or more. In a case in which t2/t3 is 1.1 or more, it is possible to further improve the photoelectric conversion characteristics as compared to a case in which t2/t3 is less than 1.1. However, t2/t3 is preferably 1.7 or less and more preferably 1.5 or less. In a case in which t2/t3 is 1.7 or less, the application of stress to the linear portion 32a by the second electrode 20 is sufficiently suppressed and the breakage of the oxide semiconductor layer 30 is less likely to occur in a case in which the distance between the first electrode 10 and the second electrode 20 is shortened as compared to a case in which t2/t3 exceeds 1.7. t2/t3 is preferably from 1.1 to 1.7 and more preferably from 1.3 to 1.5.

The ratio (t1/t2) of the thickness t1 of the corner portion 32b of the outer part 32 to the thickness t2 of the linear portion 32a of the outer part 32 is also not particularly limited as long as it is greater than 1, but it is preferably 1.1 or more and more preferably 1.2 or more. In a case in which t1/t2 is 1.1 or more, it is possible to further improve the photoelectric conversion characteristics as compared to a case in which t1/t2 is less than 1.1. However, t1/t2 is preferably 1.7 or less and more preferably 1.4 or less. In a case in which t1/t2 is 1.7 or less, the application of stress to the corner portion 32b by the second electrode 20 is sufficiently suppressed and the breakage of the oxide semiconductor layer 30 is less likely to occur in a case in which the distance between the first electrode 10 and the second electrode 20 is shortened as compared to a case in which t1/t2 exceeds 1.7. t1/t2 is preferably from 1.1 to 1.7 and more preferably from 1.2 to 1.4.

Furthermore, the ratio (t1/t3) of the thickness t1 of the corner portion 32b to the thickness t3 of the inner part 31 is preferably 2 or less. In this case, it is possible to further improve the photoelectric conversion characteristics as compared to a case in which the ratio of the thickness t1 of the corner portion 32b to the thickness t3 of the inner part 31 exceeds 2.

However, t1/t3 is preferably 1.2 or more from the viewpoint of further improving the photoelectric conversion efficiency of the dye-sensitized photoelectric conversion element 100.

The thickness of the inner part 31 of the oxide semiconductor layer 30 is usually from 2 to 40 μm and preferably from 10 to 30 μm.

<Sealing Portion>

Examples of the sealing portion 40 may include a resin such as a thermoplastic resin composed of a modified polyolefin resin, a vinyl alcohol polymer or the like, and an ultraviolet curable resin. Examples of the modified polyolefin resin may include an ionomer, an ethylene-vinylacetatic anhydride copolymer, an ethylene-methacrylic acid copolymer, and an ethylene-vinyl alcohol copolymer. These resins may be used singly or in combination of two or more kinds thereof.

(Electrolyte)

The electrolyte 50 contains, for example, a redox couple and an organic solvent. It is possible to use acetonitrile, methoxy acetonitrile, methoxy propionitrile, propionitrile, ethylene carbonate, propylene carbonate, diethyl carbonate, γ-butyrolactone, valeronitrile, pivalonitrile, glutaronitrile, methacrylonitrile, isobutyronitrile, phenyl acetonitrile, acrylonitrile, succinonitrile, oxalonitrile, pentanenitrile, and adiponitrile as the organic solvent. Examples of the redox couple may include a redox couple such as a zinc complex, an iron complex, and a cobalt complex in addition to a redox couple containing a halogen atom such as iodide ion/polyiodide ion ($I^-/I_3^-$) and bromine ion/polybromide ion. In addition, the electrolyte 50 may use an ionic liquid instead of the organic solvent. As the ionic liquid, for example, an ordinary temperature molten salt which is a known iodine salt, such as a pyridinium salt, an imidazolium salt, and a triazolium salt, and which is in a molten state at around room temperature is used. As such an ordinary temperature molten salt, for example, 1-hexyl-3-methylimidazolium iodide, 1-ethyl-3-propylimidazolium iodide, dimethylimidazolium iodide, 1-ethyl-3-methylimidazolium iodide, 1,2-dimethyl-3-propylimidazolium iodide, 1-butyl-3-methylimidazolium iodide, or 1-methyl-3-propylimidazolium iodide is preferably used.

In addition, the electrolyte 50 may use a mixture of the ionic liquid above and the organic solvent above instead of the organic solvent above.

In addition, it is possible to add an additive to the electrolyte 50. Examples of the additive may include LiI, tetrabutylammonium iodide, 4-t-butylpyridine, guanidinium thiocyanate, 1-methylbenzimidazole, and 1-butylbenzimidazole.

Moreover, as the electrolyte 50, a nanocomposite gel electrolyte which is a quasi-solid electrolyte obtained by kneading nanoparticles such as $SiO_2$, $TiO_2$, and carbon nanotubes with the electrolyte above to form a gel-like form may be used, or an electrolyte gelled using an organic gelling agent such as polyvinylidene fluoride, a polyethylene oxide derivative, and an amino acid derivative may also be used.

In addition, the electrolyte 50 contains redox couples composed of $I^-/I_3^-$, and the concentration of $I_3^-$ is preferably 0.006 mol/liter or less. In this case, since the concentration of $I_3^-$ carrying electrons is low, it is possible to further reduce a leakage current. Therefore, since the open-circuit voltage can be further increased, it is possible to further improve the photoelectric conversion characteristic. Particularly, the concentration of $I_3^-$ is preferably 0.005 mol/liter or less, more preferably in a range of 0 to $6 \times 10^{-6}$ mol/liter, even more preferably in a range of 0 to $6 \times 10^{-8}$ mol/liter. In this case, in a case where the dye-sensitized photoelectric conversion element 100 is seen from the light incident side of the conductive substrate 15, it is possible to make the color of the electrolyte 50 visually less noticeable.

(Photosensitizing Dye)

Examples of the photosensitizing dye may include a ruthenium complex having a ligand containing a bipyridine structure or a terpyridine structure, and an organic dye such as porphyrin, eosin, rhodamine, or merocyanine. Among them, a ruthenium complex having a ligand containing a bipyridine structure or a ruthenium complex having a ligand containing a terpyridine structure is preferable. In this case, it is possible to more improve the photoelectric conversion characteristics of the dye-sensitized solar cell 100.

Next, the method of manufacturing the dye-sensitized photoelectric conversion element 100 will be described.

First, a first electrode 10 constituted by a transparent conductive substrate 15 obtained by forming a transparent conductive film 12 on one transparent substrate 11 is prepared.

As the method of forming the transparent conductive film 12, a sputtering method, a vapor deposition method, a spray pyrolysis deposition method, a CVD method or the like is used.

Next, the oxide semiconductor layer 30 is formed on the transparent conductive film 12. The oxide semiconductor layer 30 is formed by printing a paste for forming an oxide semiconductor layer which contains oxide semiconductor particles and then firing the paste. At this time, the number of printing of the paste for forming an oxide semiconductor layer may be greater, for example, at the outer part than at the inner part and at the part to be the corner portion of the outer part than at the part to be the linear portion of the outer part.

The paste for forming an oxide semiconductor layer contains a resin such as polyethylene glycol and a solvent such as terpineol in addition to the oxide semiconductor particles described above.

It is possible to use, for example, a screen printing method, a doctor blading method, or a bar coating method as the printing method of the paste for forming an oxide semiconductor layer.

The firing temperature varies depending on the kind of the oxide semiconductor particles but is usually from 350 to 600° C., and the firing time also varies depending on the kind of the oxide semiconductor particles but is usually from 1 to 5 hours.

In this manner, the working electrode is obtained.

Next, the photosensitizing dye is adsorbed on the surface of the oxide semiconductor layer 30 of the working electrode. For this, the photosensitizing dye may be adsorbed on the oxide semiconductor layer 30 by immersing the working electrode in a solution containing the photosensitizing dye, making the photosensitizing dye adsorb on the oxide semiconductor layer 30, washing out the extra photosensitizing dye with the solvent component of the above solution and then drying. However, the photosensitizing dye may be adsorbed on the oxide semiconductor layer 30 by coating a solution containing the photosensitizing dye on the oxide semiconductor layer 30 and then drying.

Next, the electrolyte 50 is prepared.

Next, the electrolyte 50 is disposed on the oxide semiconductor layer 30. The electrolyte 50 can be disposed, for example, by a printing method such as screen printing or the like.

Next, an annular sealing portion forming body is prepared. The sealing portion forming body can be obtained, for example, by preparing a resin film for sealing and forming one quadrangular opening in the resin film for sealing.

Thereafter, this sealing portion forming body is bonded onto the first electrode 10. At this time, bonding of the sealing portion forming body to the first electrode 10 can be conducted, for example, by melting and heating the sealing portion forming body.

Next, a precursor layer of the second electrode 20 is prepared. This precursor layer is disposed so as to close the opening of the sealing portion forming body and then bonded to the sealing portion forming body. At this time, the sealing portion forming body may also be bonded to the precursor layer in advance, and this sealing portion forming body may be bonded to the sealing portion forming body on the first electrode 10 side. Bonding of the precursor layer to the sealing portion forming body is conducted, for example, under reduced pressure. At this time, the pressure reduction is conducted so that the inner part of the precursor layer approaches the inner part 31 of the oxide semiconductor layer 30.

The inner part of the precursor layer is thus bent toward the inner part 31 of the oxide semiconductor layer 30, and the second electrode 20 is formed. The dye-sensitized photoelectric conversion element 100 constituted by one dye-sensitized photoelectric conversion cell 60 is obtained in the manner as described above.

The invention is not limited to the embodiments described above. For example, in the embodiments described above, the dye-sensitized photoelectric conversion element 100 has a structure in which the oxide semiconductor layer 30 is provided on the transparent conductive film 12 of the transparent conductive substrate 15 and light is thus received from the transparent conductive substrate 15 side, but the dye-sensitized photoelectric conversion element may have a structure in which an opaque material (for example, metal substrate) is used as the base material on which the oxide semiconductor layer 30 is formed, a transparent material is used as a base material for forming the second electrode 20, and light is thus received from the second electrode 20 side, and further, it may have a structure in which light is received from both surfaces.

In addition, in the above embodiment, the sealing portion 40 and the oxide semiconductor layer 30 are separated from each other, but the sealing portion 40 and the oxide semiconductor layer 30 may be in contact with each other.

Furthermore, in the above embodiment, the second linear portion 40a of the sealing portion 40 is provided along the outer part 32 of the oxide semiconductor layer 30, but the second linear portion 40a of the sealing portion 40 is not necessarily provided along the outer part 32 of the oxide semiconductor layer 30.

In addition, in the above embodiment, the corner portion 32b of the outer part 32 is constituted by the intersecting portion 33 that is formed by extending and crossing two linear portions 32a in a case in which the oxide semiconductor layer 30 is viewed in the thickness direction A thereof, but the corner portion 32b may be formed by cutting off a part 34 on the side opposite to the inner part 31 of the quadrangular intersecting portion 33 that is formed by extending and crossing two linear portions 32a as illustrated in FIG. 5. In this case, the corner portion 32b of the oxide semiconductor layer 30 is less likely to peel off from the first electrode 10 and it is possible to improve the durability of the dye-sensitized photoelectric conversion element 100 equipped with the dye-sensitized photoelectric conversion cell 60 as compared to a case in which the corner portion 32b is formed without cutting off the part 34 on the side opposite to the inner part 31 of the intersecting portion 33 that is formed by extending and crossing two linear portions 32a in a case in which the oxide semiconductor layer 30 is viewed in the thickness direction A thereof.

Here, the shape of the corner part of the corner portion 32b, namely, the part on the side opposite to the inner part 31 of the corner portion 32b may be an arc shape as illustrated in FIG. 5, or it may be a straight linear shape.

In a case in which the shape of the corner part of the corner portion 32b is an arc shape, the radius of curvature R thereof is not particularly limited, but it is preferably from 0.1 to 5 mm and more preferably from 0.5 to 3 mm. In a case in which R is from 0.1 to 5 mm, it is possible to increase the effect of alleviating the concentration of stress applied to the corner portion 32b as compared to a case in which R is less than 0.1 mm, and it is thus possible to further improve the durability of the dye-sensitized photoelectric conversion element 100. In addition, in a case in which R is from 0.1 to 5 mm, it is possible to further increase the power generation area and to further improve the photoelectric conversion characteristics of the dye-sensitized photoelectric conversion element 100 as compared to a case in which R exceeds 5 mm.

In a case in which the shape of the corner part of the corner portion 32b is a straight linear shape, the length L thereof is not particularly limited, but it is preferably from 0.14 to 4.2 mm and more preferably from 0.3 to 3.0 mm. In this case, it is possible to increase the effect of alleviating the concentration of stress applied to the corner portion 32b as compared to a case in which L is less than 0.14 mm, and it is thus possible to further improve the durability of the dye-sensitized photoelectric conversion element 100. In addition, in a case in which L is from 0.14 to 4.2 mm, it is possible to further increase the power generation area and to further improve the photoelectric conversion characteristics of the dye-sensitized photoelectric conversion element 100 as compared to a case in which L exceeds 4.2 mm.

In addition, in the above embodiment, the peripheral portion of the transparent conductive film 12 is sandwiched between the sealing portion 40 and the transparent substrate 11, but the peripheral portion of the transparent conductive film 12 may not be sandwiched between the sealing portion 40 and the transparent substrate 11 except the power extracting portion.

In addition, in the embodiments described above, the dye-sensitized photoelectric conversion element 100 is constituted by one dye-sensitized photoelectric conversion cell 60, but the dye-sensitized photoelectric conversion element may be equipped with a plurality of dye-sensitized photoelectric conversion cells 60.

In addition, in the above embodiment, the outer part 32 includes only four linear portions 32a, but the outer part 32 may include a plurality of linear portions 32a, and it may include two linear portions 32a, three linear portions 32a, and five or more linear portions 32a. In addition, the outer part 32 has a rectangular shape, but the outer part 32 may have an annular shape, and it may have a triangular shape, a pentagonal shape, a hexagonal shape, or a circular shape in addition to a rectangular shape.

Furthermore, in the above embodiment, the first electrode 10 and the second electrode 20 are joined by the sealing portion 40, but the first electrode 10 and the second electrode 20 may not be joined by the sealing portion 40 in a case in which a porous insulating layer that is impregnated with the electrolyte 50 is provided between the first electrode 10 and the second electrode 20. However, in this case, it is required to provide a base material on the side opposite to the first electrode 10 with respect to the second electrode 20 and to join this base material and the first electrode 10 by the sealing portion.

Hereinafter, the contents of the invention will be more specifically described with reference to Examples, but the invention is not limited to the following Examples.

First, a transparent conductive substrate obtained by forming a transparent conductive film composed of FTO and having a thickness of 1 μm on a transparent substrate composed of glass and having a thickness of 1 mm was prepared as a first electrode.

Next, a paste for forming an oxide semiconductor layer which contained titania was screen-printed on a transparent conductive film of the first electrode by using a printing plate having a rectangular screen having a dimension of 2 cm×4 cm and fired at 500° C. for 1 hour. A working electrode having an oxide semiconductor layer having a dimension of 2 cm×4 cm was thus obtained. At this time, the thickness t1 of the corner portion of the outer part, the thickness t2 of the linear portion of the outer part, and the thickness t3 of the inner part were adjusted to the values presented in Table 1 by setting the number of printing of the paste for forming an oxide semiconductor layer to be greater at the outer part than at the inner part and at the part to be the corner portion of the outer part than at the part to be the linear portion of the outer part. In addition, the shape of the corner of the corner portion was formed so as to be a point.

Next, the working electrode was immersed in a photosensitizing dye solution for a whole day and night, then taken out therefrom, and dried, thereby adsorbing the photosensitizing dye to the oxide semiconductor layer. The photosensitizing dye solution was fabricated by dissolving a photosensitizing dye composed of Z907 in a mixed solvent prepared by mixing acetonitrile and t-butanol at a volume ratio of 1:1 so as to have a concentration of 0.2 mM.

Next, an electrolyte was coated on the oxide semiconductor layer. As the electrolyte, a 3-methoxypropionitrile (MPN) solution containing iodine at 0.002 M and 1,2-dimethyl-3-propylimidazolium iodide (DMPImI) at 0.6 M was prepared.

Next, a sealing portion forming body for forming the sealing portion was prepared. The sealing portion forming body was obtained by preparing one sheet of resin film for sealing which was composed of Bynel 14164 (trade name, manufactured by Du Pont) and had a dimension of 5.0 mm×7.0 mm×100 µm, and forming a quadrangular opening on the resin film for sealing. At this time, the opening was formed so as to have a size of 2.4 mm×4.4 mm×100 µm.

Thereafter, this sealing portion forming body was mounted on the working electrode, and the sealing portion forming body was then heated and melted to be bonded to the working electrode.

Next, a precursor layer of the second electrode was prepared. The precursor layer was prepared by forming a catalyst layer which was composed of platinum and had a thickness of 10 nm on a titanium foil having a dimension of 5.0 mm×7.0 mm×0.05 mm by a sputtering method. In addition, one more of the above-mentioned sealing portion forming body was prepared, and this sealing portion forming body was bonded to the surface facing the working electrode of the counter electrode in the same manner as the above.

Thereafter, the sealing portion forming body bonded to the working electrode was allowed to face the sealing portion forming body bonded to the counter electrode so that the sealing portion forming bodies overlapped with each other. Thereafter, the sealing portion forming bodies were heated and melted while being pressurized under reduced pressure. At this time, the pressure reduction was conducted so that the inner part of the precursor layer approached the inner part of the oxide semiconductor layer. Specifically, the pressure in the space when heating and melting of the sealing portion forming body was conducted was set to 650 Pa. A sealing portion was thus formed between the working electrode and the counter electrode.

A dye-sensitized photoelectric conversion element composed of one dye-sensitized photoelectric conversion cell was obtained in the manner as described above.

EXAMPLE 2

A dye-sensitized photoelectric conversion element was obtained in the same manner as in Example 1 except that the oxide semiconductor layer was formed so that the shape of the corner part of the corner portion was an arc shape having a radius of curvature of 0.5 mm by screen-printing the paste for forming an oxide semiconductor layer which contained titania by using a printing plate having a screen in which the shape of the corner part of the rectangular corner portion which had a dimension of 2 cm×4 cm was an arc shape having a radius of curvature of 0.5 mm and firing the paste at 500° C. for 1 hour.

EXAMPLE 3

A dye-sensitized photoelectric conversion element was obtained in the same manner as in Example 1 except that the oxide semiconductor layer was formed so that the shape of the corner part of the corner portion was a straight linear shape having a length of 0.71 mm by screen-printing the paste for forming an oxide semiconductor layer which contained titania by using a printing plate having a screen in which the shape of the corner part of the rectangular corner portion which had a dimension of 2 cm×4 cm was a straight linear shape having a length of 0.71 mm and firing the paste at 500° C. for 1 hour.

COMPARATIVE EXAMPLE 1

A dye-sensitized photoelectric conversion element was obtained in the same manner as in Example 1 except that heating and melting of the sealing portion forming body was conducted at atmospheric pressure so that the approaching portion was not formed in the second electrode as well as the thickness t1 of the corner portion of the outer part, the thickness t2 of the linear portion of the outer part, and the thickness t3 of the inner part were adjusted to the values presented in Table 1 by setting the number of printing of the paste for forming an oxide semiconductor layer containing titania to be constant regardless of places.

COMPARATIVE EXAMPLE 2

A dye-sensitized photoelectric conversion element was obtained in the same manner as in Example 1 except that the thickness t1 of the corner portion of the outer part, the thickness t2 of the linear portion of the outer part, and the thickness t3 of the inner part were adjusted to the values presented in Table 1 by setting the number of printing of the paste for forming an oxide semiconductor layer containing titania to be constant regardless of places.

COMPARATIVE EXAMPLE 3

A dye-sensitized photoelectric conversion element was obtained in the same manner as in Example 1 except that heating and melting of the sealing portion forming body was conducted at atmospheric pressure so that the approaching portion was not formed in the second electrode as well as the thickness t1 of the corner portion of the outer part, the thickness t2 of the linear portion of the outer part, and the thickness t3 of the inner part were adjusted to the values presented in Table 1 by setting the number of printing of the paste for forming an oxide semiconductor layer containing titania to be greater at the outer part than at the inner part and the same at the part to be the linear portion of the outer part and at the part to be the corner portion of the outer part.

COMPARATIVE EXAMPLE 4

A dye-sensitized photoelectric conversion element was obtained in the same manner as in Example 1 except that heating and melting of the sealing portion forming body was conducted at atmospheric pressure so that the approaching portion was not formed in the second electrode as well as the thickness t1 of the corner portion of the outer part, the thickness t2 of the linear portion of the outer part, and the thickness t3 of the inner part were adjusted to the values presented in Table 1 by setting the number of printing of the paste for forming an oxide semiconductor layer containing titania to be greater at the outer part than at the inner part and at the part to be the corner portion of the outer part than at the part to be the linear portion of the outer part.

<Evaluation on Properties>

(1) Measurement of Mapping of Short-Circuit Current Density

With regard to the dye-sensitized photoelectric conversion elements of Examples 1 to 3 and Comparative Examples 1 to 4 obtained as described above, the measurement of mapping of short-circuit current density at the inner part of the oxide semiconductor layer and the linear portion and corner portion of the outer part was conducted. The results are presented in Table 1. Incidentally, in Table 1, the short-circuit current density was presented as a relative value when the short-circuit current density in the dye-sensitized photoelectric conversion element of Comparative Example 1 was set to 1.

(2) Improvement Rate of Photoelectric Conversion Characteristics

With regard to the dye-sensitized photoelectric conversion elements of Examples 1 to 3 and Comparative Examples 1 to 4 obtained as described above, the photoelectric conversion efficiency 71 was measured by conducting the I-V measurement in a state of being irradiated with light from a white LED having an illuminance of 1000 lux, and the improvement rate (%) of the photoelectric conversion efficiency η was calculated based on the following formula by taking Comparative Example 1 as reference. The results are presented in Table 1.

Improvement rate (%) of η=100×(η of Example or Comparative Example−η of Comparative Example 1)/η of Comparative Example 1

EXPLANATIONS OF REFERENCE NUMERALS

10 . . . First electrode
20 . . . Second electrode
20$a$ . . . Annular portion
20$b$ . . . Connecting portion
20$c$ . . . Approaching portion
30 . . . Oxide semiconductor layer
31 . . . Inner part
32 . . . Outer part
32$a$ . . . Linear portion
32$b$ Corner portion
33 . . . Intersecting portion
34 . . . Cut-off portion
40 . . . Sealing portion
40$a$ . . . Second linear portion
40$b$ . . . Second corner portion
50 . . . Electrolyte
60 . . . Dye-sensitized photoelectric conversion cell
100 . . . Dye-sensitized photoelectric conversion element
T1 . . . Thickness of corner portion
T2 . . . Thickness of linear portion
T3 . . . Thickness of inner part
A . . . Thickness direction of oxide semiconductor layer

The invention claimed is:

1. A dye-sensitized photoelectric conversion element comprising:
at least one dye-sensitized photoelectric conversion cell, wherein
the dye-sensitized photoelectric conversion cell includes:
a first electrode;
a second electrode facing the first electrode;
an oxide semiconductor layer provided on the first electrode; and
an electrolyte provided between the first electrode and the second electrode, wherein

TABLE 1

| | Oxide semiconductor layer | | | | Second electrode Presence/ absence of approaching portion | Short circuit current density (short-circuit current density in inner part of Comparative Example 1 is set to 1) | | | Photoelectric conversion characteristics Improvement rate of η (%) |
|---|---|---|---|---|---|---|---|---|---|
| | Thickness t1 of corner portion of outer part (μm) | Thickness t2 of linear portion of outer part (μm) | Thickness t3 of inner part (μm) | Shape of corner part of corner portion | | Inner part | Linear portion of outer part | Corner portion of outer part | |
| Example 1 | 14 | 11 | 8 | Point | Presence | 1.30 | 1.30 | 1.30 | 8.9 |
| Example 2 | 14 | 11 | 8 | Arc shape | Presence | 1.30 | 1.30 | 1.28 | 8.8 |
| Example 3 | 14 | 11 | 8 | Straight linear | Presence | 1.30 | 1.30 | 1.28 | 8.8 |
| Comparative Example 1 | 8 | 8 | 8 | Point | Absence | 1.00 | 1.00 | 1.00 | 0 |
| Comparative Example 2 | 8 | 8 | 8 | Point | Presence | 1.30 | 1.11 | 1.11 | 6.3 |
| Comparative Example 3 | 11 | 11 | 8 | Point | Absence | 1.00 | 1.04 | 1.04 | 0.5 |
| Comparative Example 4 | 14 | 11 | 8 | Point | Absence | 1.00 | 1.04 | 1.09 | 0.9 |

From the results presented in Table 1, it has been found that the dye-sensitized photoelectric conversion elements of Examples 1 to 3 can improve the photoelectric conversion characteristics more than the dye-sensitized photoelectric conversion elements of Comparative Examples 1 to 4.

From the above, it has been confirmed that it is possible to improve the photoelectric conversion characteristics according to the dye-sensitized photoelectric conversion element of the present invention.

the second electrode includes:
an annular portion;
an approaching portion approaching the oxide semiconductor layer closer than the annular portion; and
an annular connecting portion connecting the annular portion and the approaching portion, and
the oxide semiconductor layer includes:
an inner part facing the approaching portion of the second electrode on the first electrode; and an annular outer part that is provided around the inner part and faces the connecting portion of the second electrode, wherein the outer part includes:

a plurality of linear portions separated from one another and a corner portion connecting two adjacent linear portions to each other among the plurality of linear portions in a case in which the outer part is viewed in a thickness direction of the oxide semiconductor layer, a thickness of the corner portion of the outer part is greater than a thickness of the linear portion of the outer part, and a thickness of the linear portion of the outer part is greater than a thickness of the inner part;

the thickness direction being the direction in which the first electrode, the oxide semiconductor layer, and the second electrode are stacked.

2. The dye-sensitized photoelectric conversion element according to claim 1, wherein a ratio of a thickness of the linear portion of the outer part to a thickness of the inner part is 1.1 or more.

3. The dye-sensitized photoelectric conversion element according to claim 1, wherein a ratio of a thickness of the linear portion of the outer part to a thickness of the inner part is 1.7 or less.

4. The dye-sensitized photoelectric conversion element according to claim 1, wherein a ratio of a thickness of the corner portion of the outer part to a thickness of the linear portion of the outer part is 1.1 or more.

5. The dye-sensitized photoelectric conversion element according to claim 1, wherein a ratio of a thickness of the corner portion of the outer part to a thickness of the linear portion of the outer part is 1.7 or less.

6. The dye-sensitized photoelectric conversion element according to claim 1, wherein the corner portion is formed by cutting off a part on a side opposite to the inner part of an intersecting portion formed by extending and crossing the two linear portions in a case in which the oxide semiconductor layer is viewed in a thickness direction of the oxide semiconductor layer.

7. The dye-sensitized photoelectric conversion element according to claim 1, wherein the dye-sensitized photoelectric conversion cell further includes an annular sealing portion joining the first electrode and the annular portion of the second electrode, wherein the sealing portion and the oxide semiconductor layer are separated from each other.

8. The dye-sensitized photoelectric conversion element according to claim 7, wherein the sealing portion is disposed so as to surround the oxide semiconductor layer, and the sealing portion includes:

a plurality of second linear portions provided along the outer part of the oxide semiconductor layer and a second corner portion connecting two adjacent second linear portions each other among the plurality of second linear portions in a case in which the sealing portion is viewed in a thickness direction of the oxide semiconductor layer, wherein the second corner portion of the sealing portion is disposed on a side opposite to the inner part with respect to a corner portion of the outer part.

9. The dye-sensitized photoelectric conversion element according to claim 1, wherein a ratio of a thickness of the corner portion to a thickness of the inner part is 2 or less.

10. The dye-sensitized photoelectric conversion element according to claim 1, wherein a ratio of a thickness of the corner portion to a thickness of the inner part is 1.2 or more.

* * * * *